United States Patent [19]

Kratz

[11] 4,199,001
[45] Apr. 22, 1980

[54] CHEMICAL FEEDER

[76] Inventor: David W. Kratz, 17 Country Life Acres, St. Louis County, Mo. 63131

[21] Appl. No.: 899,265

[22] Filed: Apr. 24, 1978

[51] Int. Cl.² .............................................. B01F 1/00
[52] U.S. Cl. ..................................... 137/268; 422/264
[58] Field of Search ............ 137/268; 422/264, 264 B, 422/255, 261, 262, 263

[56] References Cited

U.S. PATENT DOCUMENTS

| | | | |
|---|---|---|---|
| 3,195,558 | 7/1965 | Klueber | 137/268 |
| 3,323,539 | 6/1967 | Schneider | 137/268 |
| 3,416,897 | 12/1968 | Long | 422/264 |
| 3,612,080 | 10/1971 | Schneider | 137/268 V |
| 3,802,845 | 4/1975 | Tepas | 422/264 |

*Primary Examiner*—Alan Cohan
*Attorney, Agent, or Firm*—Kalish & Gilster

[57] ABSTRACT

A chemical feeder comprising a container having an internal divider for developing an upper compartment for supporting a supply of treatment chemical and a lower compartment for receiving the liquid solvent with orifices in said divider for permitting the liquid to rise upwardly for dissolution of the treatment material. First and second weirs of different heights are provided in said container for controlling the level of liquid in the upper compartment and, hence, the concentration of the solution formed with control means for permitting optional usage of said weirs. A housing retaining a float valve supportingly receives the lower portion of said container and is in communication therewith for accepting the formed solution; there being a discharge outlet in said housing controlled by a needle valve integral with said float valve. Control for the level of liquid in said container is provided.

23 Claims, 7 Drawing Figures

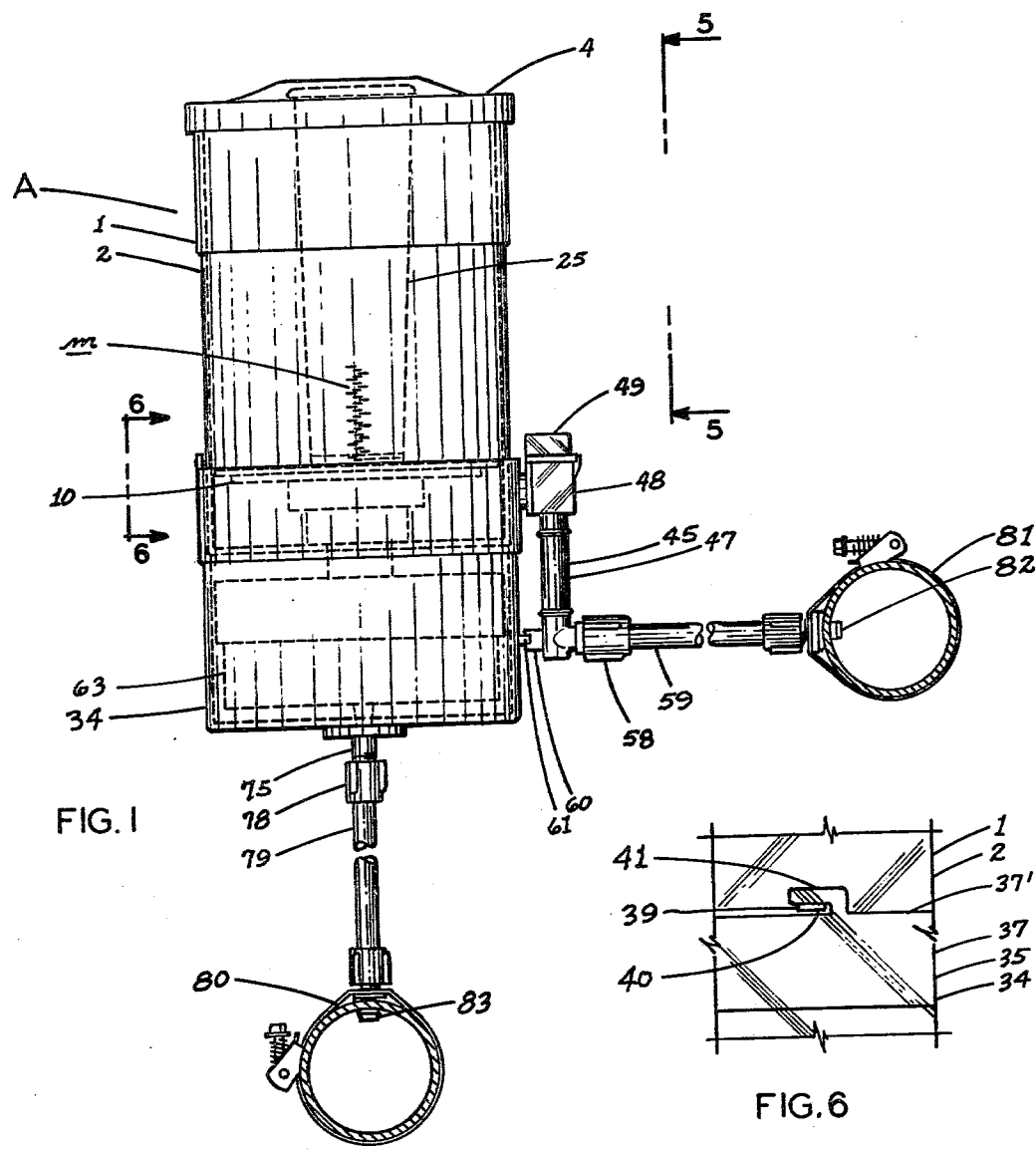
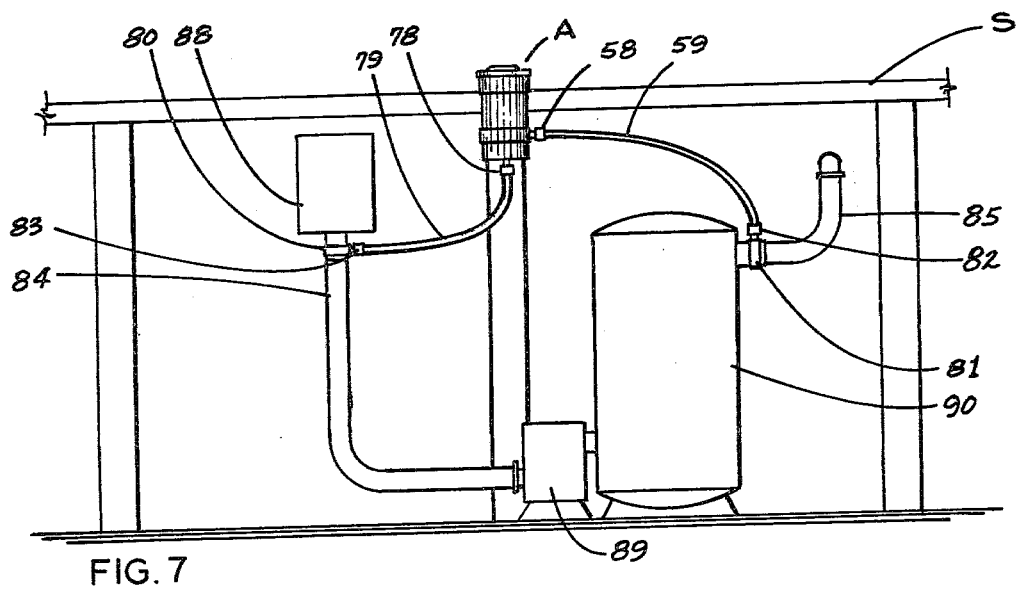

CHEMICAL FEEDER

BACKGROUND AND SUMMARY OF THE INVENTION

This invention relates in general to liquid treatment and, more particularly, to a chemical feeder for use in a system for treating liquid circulating therethrough.

It is a primary object of the present invention to provide apparatus for the automatic provision of treatment material to liquid circulating systems, such as those for potable water, for swimming pools, and the like, wherein the liquid of the system serves as a solvent for the treatment material.

It is a further object of the present invention to provide a feeder for use in a liquid circulating system adapted to present treatment material to the liquid to be treated in order that the system may have a preselected concentration of the material within a most substantial broad range of concentration.

It is another object of the present invention to provide a feeder of the type stated which may be readily integrated into existing liquid circulating systems without requiring costly modification thereof and which feeder is unique in being a self-contained entity for adapting its introduction into such existing systems.

One particular usage of the present invention is with swimming pools for the purpose of maintaining the water therein at a certain level of chlorination for the safety of the pool users.

Heretofore there have been numerous efforts at developing apparatus for introducing chlorine into swimming pools from a chlorinating unit wherein the water is caused to flow through a container of a solid compound, such as one containing available chlorine, for instance, calcium hypochlorite, trichloro-s-triazinetrione, and the like, and with the developing solution being circulated within the particular system. However, since the height of the level of water within the treatment material containing unit determines the concentration of the formed solution, there has been a constant problem in this field of requisite control of such level to bring about the desired concentration. Various prior art patents demonstrating containers for such compounds include the U.S. Pat. Nos. to Pickering 492,631; Sevcik 1,409,248; Tepas 2,738,323; Leslie 2,820,701; and Walker 3,145,087 as well as the patent to King et al 3,390,695. As a study of these earlier efforts will reveal the primary thrust had been directed at causing the water to be introduced within the compound-containing vessel at a point coincident with the level desired for the preselected concentration. Consequently, certain complex controls were required to cause the water introducing or distributor head to be so located and which arrangement in practice would not permit of either a relatively precise control of the resultant concentration or produce the capacity for a relatively wide range of constantly measurable concentration. Furthermore, a study of the art does not reveal any structures permitting of what could be considered as amounting to a superchlorination, that is, wherein the level of introduced fluid could achieve coincidence with or exceed the uppermost layer of the chemical.

The present invention is so uniquely constructed that the solvent, or water in this case, is introduced beneath the chemical supply and permitted to rise upwardly therethrough or, as it were, "back" through the supply of solute.

The present invention additionally, by reason of the provision of the novel path of flow of the solvent permits of a concentration or, chlorination rate in this case, which has not been heretofore obtainable by prior art developments and which feature is promoted by a vertically adjustable weir, the location of the upper end of which is so correlated with the scale as to produce the selected solution rate.

Furthermore, the present invention is quite distinct from the prior art in incorporating an enlarged substantially nonvertically adjustable weir which allows for a maximum concentration of the solute. The feeder provided by the present invention permits of a selectivity of operation between finely controlled concentration levels and a substantially super-saturation level, which selectivity has no counterpart in the prior art.

Additionally, the present feeder is so constructed and with the various components so related so that in the event of any unforeseen interference with the smooth operation thereof, a readily determinable visual condition is caused as by the limited over-flow or "weeping" of the solution through a joint within the system so as to immediately signal to the user the existence of a critical condition requiring immediate rectification.

It is another object of the present invention to provide a feeder of the type stated which is composed of a limited number of highly durable components adapted for ease of integration and permitting of disposition within the preselected of two basic modes of operation without requiring the exercise of skill on the part of the user.

The present invention is also unique in embodying a flow meter which promotes quick visual determination by the operator as to the approximate rate of flow of incoming fluid so that the chosen rate may be maintained with less than limited difficulty.

It is a still further object of the present invention to provide a chemical feeder for use in liquid circulating systems which may be most economically manufactured, being amenable to high volume production; which incorporates unique controls which are simply manipulated; which is easily handled by the average individual for home swimming pool usage; which is peculiarly designed for rapid integration within existing systems incorporating the usual skimmers, pumps and filters; and which is extremely durable and reliable in usage.

BRIEF DESCRIPTION OF THE DRAWINGS

FIG. 1 is a side elevational view of a chemical feeder constructed in accordance with and embodying the present invention.

FIG. 6 is a fragmentary side elevational view taken on the line 6—6 of FIG. 1.

FIG. 7 is a schematic view of a liquid circulating system incorporating the feeder.

DESCRIPTION OF THE PREFERRED EMBODIMENT

Figure 4:
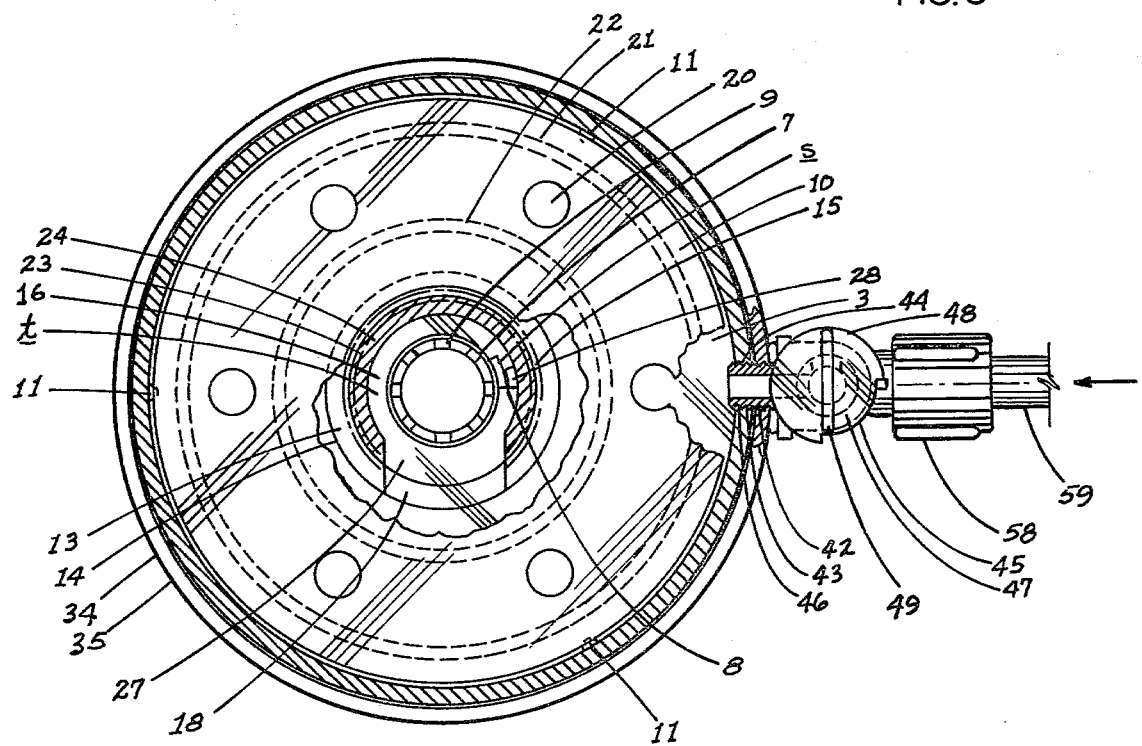
FIG. 4 is a horizontal transverse sectional view taken on the line 4—4 of FIG. 2.

Referring now by reference characters to the drawings which illustrate the preferred embodiment of the present invention, A generally designates a chemical feeder of the type primarily designed for use with liquid circulating systems, as for potable water, swimming pools, and the like, in order to effect the introduction of liquid treatment material thereinto; said feeder comprises a relatively enlarged container 1, the volume understandably being dictated by the amount of treatment material to be accommodated so that frequent replenishment is not required. Container 1 is of general cylindrical form having a side wall 2, bottom wall 3 and being open at the top thereof for receiving a removable closure 4. The material of construction of container 1 is of transparent character and thus may be glass, but preferably of a suitable plastic for durability and resistance of fracture, with such transparency allowing a ready visual inspection of the state of supply of the treatment material contained therein, as well as the general operation of the device. Bottom wall 3 is centrally provided with a threaded aperture 5 for engaging the external threads 6 of an open ended standpipe or adjustable weir 7 being of predetermined length for control of the liquid level within container 1 within a predetermined range for purposes presently appearing. With weir 7 in full "up" position to permit of its maximum level control the base or lower end face thereof will be substantially aligned with the under face of container bottom wall 3; and with said weir 7 in full "down" position to allow of minimum liquid level within container 1, a detent 8 formed on bottom wall 3 adjacent aperture 5 will be in abutting relationship with a stop s projecting radially from the side wall of weir 7, downwardly from the upper end thereof a preselected distance. The upper portion of weir 7 is notched circumferentially, as at 9 for receiving any convenient instrument, such as a knife, to facilitate threading of weir 7 to the desired relative positon with respect to bottom wall 3. When in full "down" position (FIG. 2) the upper or notched end edge of weir 7 will be substantially aligned with the undersurface of a plate 10 (FIGS. 2, 4) which is of a generally circular or disc form with the outer edges thereof being supported upon circumferentially spaced apart shoulder-forming bosses 11 integral with container 1. Plate 10 is centrally provided with an enlarged circular opening 12 of substantially greater diameter than weir 7 which may thus pass freely therethrough in concentricity therewith. The under surface of plate 10 adjacent opening 12 is adapted to rest upon the upper end surface 13 of a generally cylindrical support 14 upstanding from and integral with bottom wall 3; said support 14 being also concentric with aperture 5 and being open at its upper end as at e. Internally, support 14 is threaded throughout its height, as at 15. The inside diameter of support 14 is greater than that of aperture 5 thereby providing an annular spacing, as at 16, intervening between same and weir 7; said detent 8 being thus disposed on the base of said spacing 16. Support 14 is cut-away in the side wall thereof to present an enlarged port 18 for reasons to be discussed below.

Plate 10 is also provided with a plurality of orifices 20 arranged about, and preferably concentric with, opening 12, but being of relatively reduced diameter; said orifices 20 being located substantially intermediate said opening 12 and the periphery of plate 10. Depending from plate 10 immediately adjacent, but slightly spacedly inwardly of, the outer margin thereof is a short continuous flange 21 for abutting on the outer surfaces thereof with bosses 11 whereby plate 10 is stabilized in operative position and thus restrained against any undesired shifting. Also integral with plate 10 and depending from the under surface thereof substantially intermediate orifices 20 and opening 12 is a relatively deep or extended flange 22 for disposition spacedly outwardly of, and in encircling relationship with respect to, support 14; the lower edge of flange 22 terminating above container bottom wall 3. As will be described herein below, flange 22 serves as a liquid impingement or dispersing surface on its outer face.

Engageable with threads 15 of support 14 are the external threads 23 of the base portion 24 of a relatively enlarged conduit or weir 25, which, as will be shown below, is of generally single purpose as opposed to the multi-purpose character of weir 7. The upper portion of weir 25, progressing from threads 23, is desirably tapered slightly upwardly and outwardly toward its normally open upper end on which a cap 26 is demountable. Said conduit 25 is substantially of the same height as container 1 but its lower threaded portion 23 is of slightly greater vertical extent than support 14 so that the requisite limited relative adjustment between same may be effected as will be shown. With weir 25 fully engaged within support 14 the lower end edge of weir 25 will be supported upon container base wall 3 and such threaded portion is also provided with a lateral cut-away zone to present a port 27 of matching extent and contour with port 18 of support 14 so that with weir 25 in fully threaded, downward position within support 14 said ports 27 and 18 will be in full registration. Thus by reverse threading, or backing off, through but a limited angle, of weir 25 alignment between said ports 27, 28 will be lost and port 18 will accordingly be effectively blocked by the occluding, confronting portion of the lower end of weir 25. In port-aligning condition weir 25 is stabilized by means of a projection 28 which integral therewith and detainingly strikes against a portion of stop s which may not be concurrently engaging detent 8.

Figure 2:
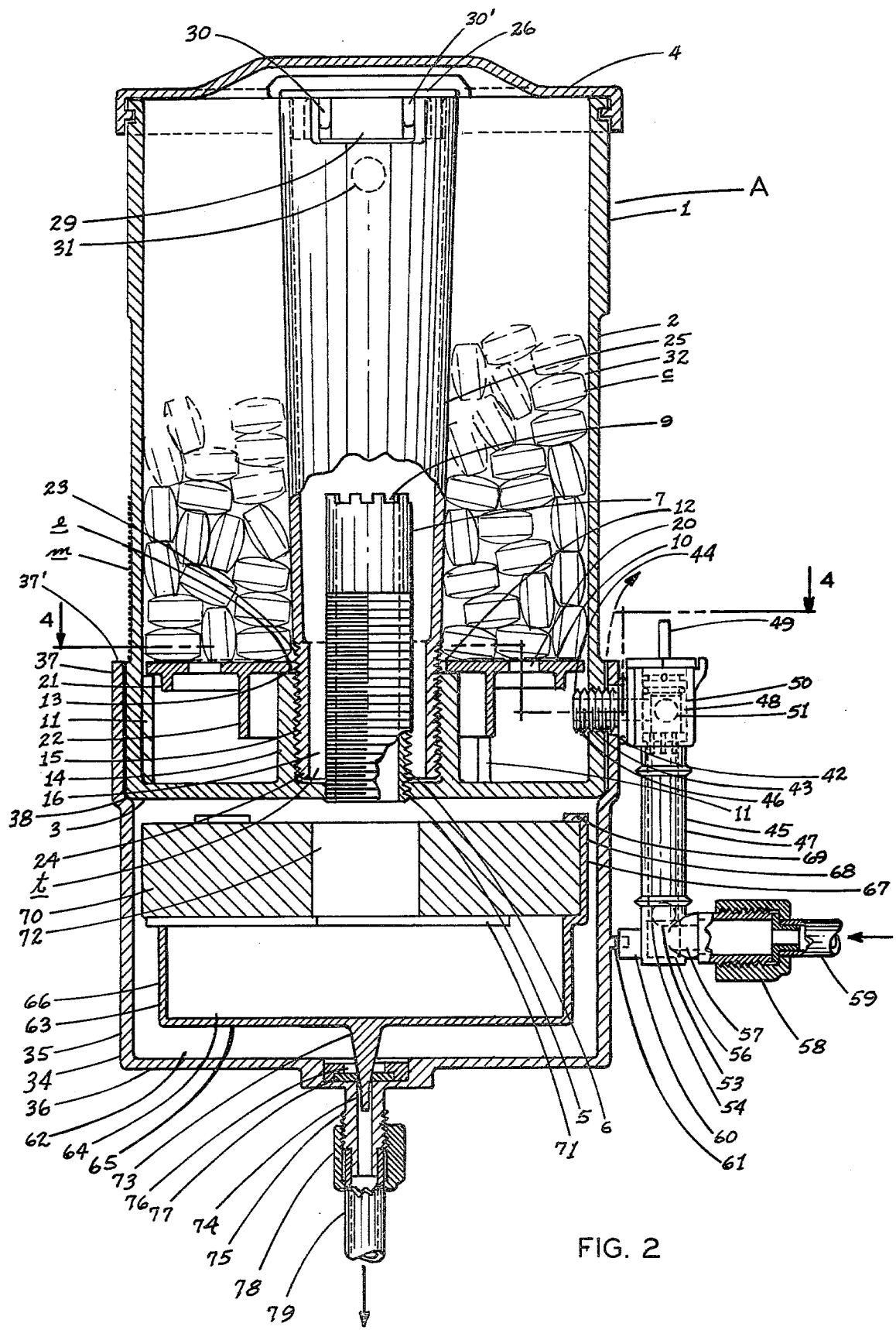
FIG. 2 is a vertical transverse sectional view of the feeder in normal treatment mode, illustrating adjustable vertical weir in full "up" position.
Figure 3:
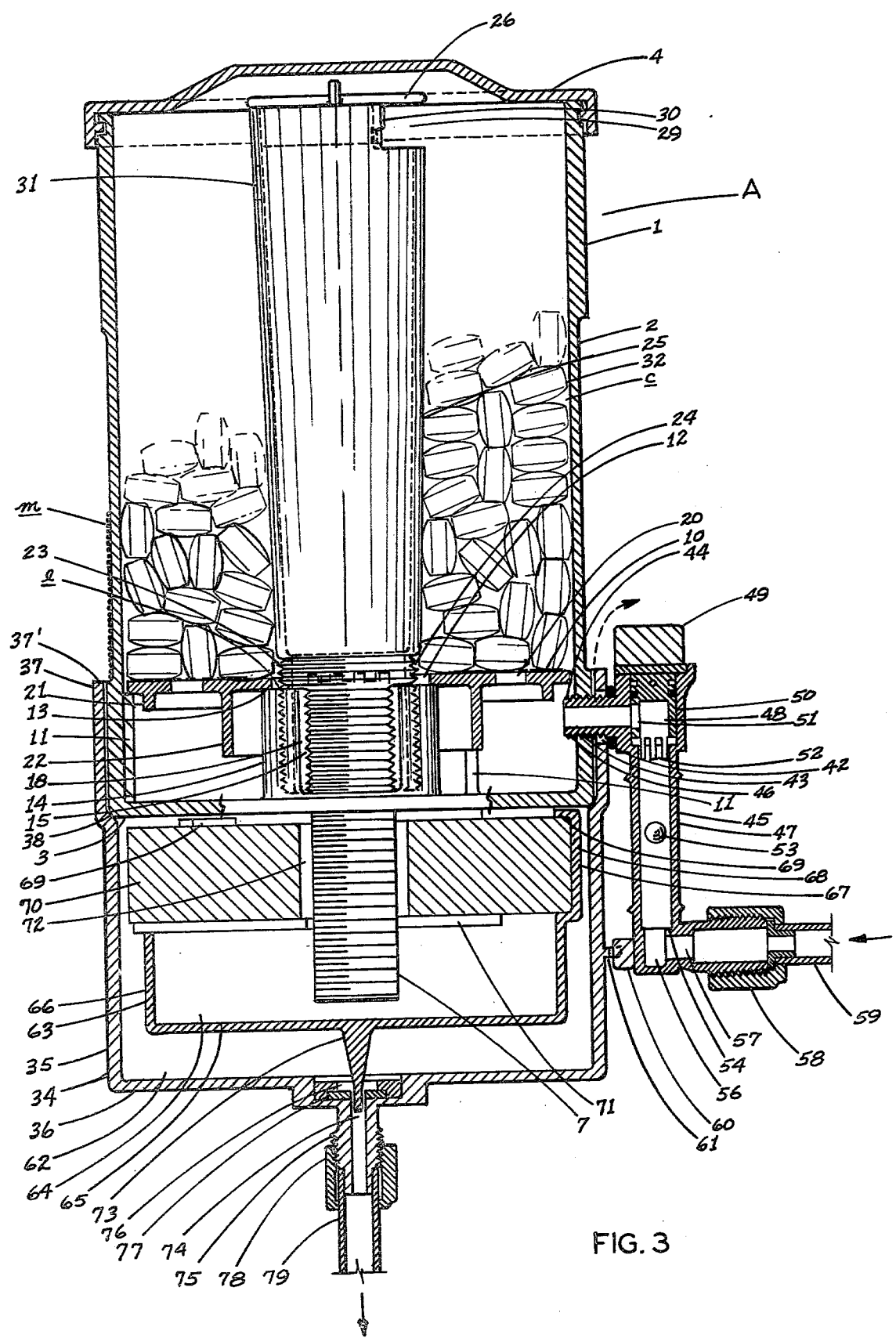
FIG. 3 is a vertical transverse sectional view of the feeder in super-treatment mode.
Figure 5:
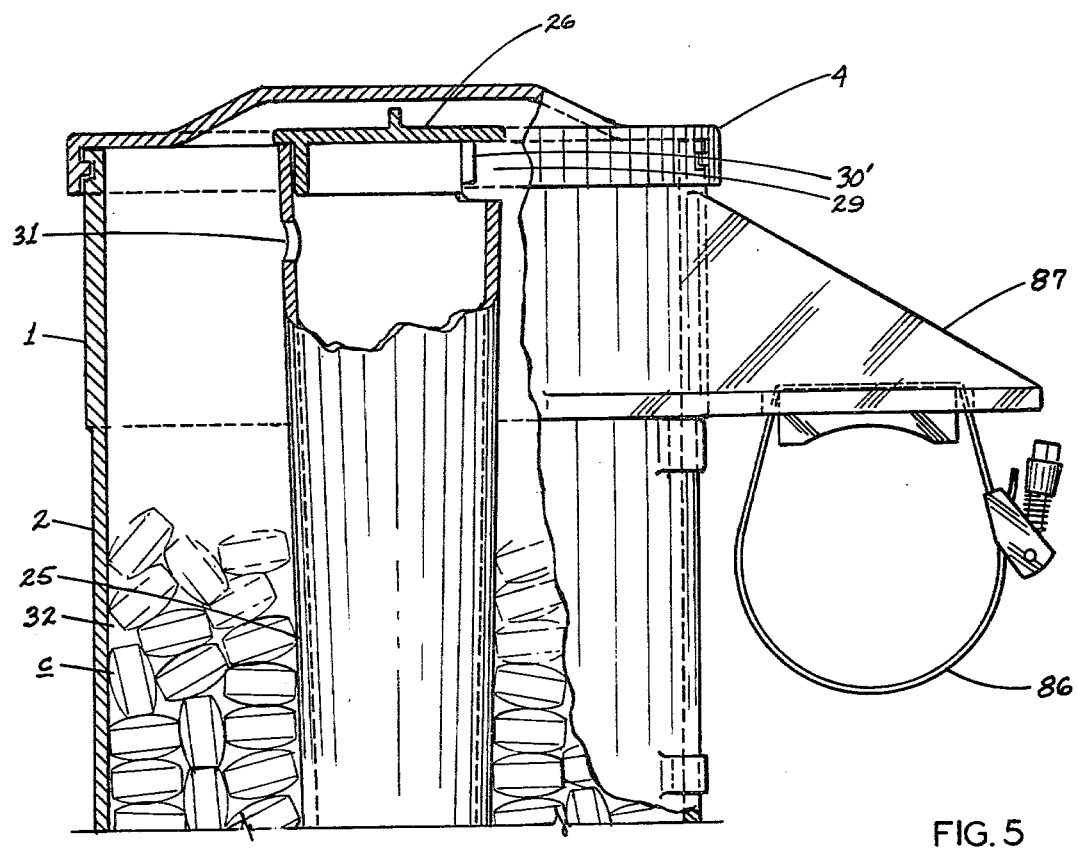
FIG. 5 is a fragmentary side elevational view taken on the line 5—5 of FIG. 1, illustrating feeder mounting.

Thus, with reference to FIG. 2, a chemical feeder is in such condition that ports 18 and 27 are in full registration which relationship may be considered to constitute the more normal treatment mode of said feeder A. FIG. 3 illustrates the ports 18 and 27 as being in nonregistering relationship bringing about a second mode of operation of feeder A wherein abnormal or super-treatment of the circulating liquid is effected. Thus these two conditions or modes of operation will be discussed more fully hereinbelow.

With reference to said FIGS. 2 and 3 it will be seen that weir 25 projects freely upwardly through opening 12 of plate 10 and is of sufficient diameter so as to contain weir 7 with a substantial intervening annular spacing therebetween as at t. Weir 25 at the upper end thereof is provided with an opening 29 which is at all times in an open condition and retained thereso by reason of stops 30, 30' depending from the top wall of closure 26 which stops against the vertical side edges of opening 29 (FIG. 2). Substantially diametrically opposed to opening 29 and slightly therebelow is a relatively small overflow orifice 31.

Plate 10 in effect divides the interior of container 1 into an enlarged upper compartment 32 and a lower smaller compartment 33. In usage, upper compartment 32 provides a reservoir for the liquid treatment compound generally indicated broadly at c which fills the volume of said compartment 32 in surrounding relationship to weir 25. For example, such treatment compound may be calcium hypochlorite, trichloro-s-triazinetrione or any other suitable compound providing available chlorine, being in solid tabular form and, being about one inch in diameter and one-half inch thick. But such dimensions are clearly not critical. However, it is obvious that treatment material may be of other suitable compounds compatible with the particular liquid in question and may be in granular form or small irregular fragments, as the case may be. For purposes of illustration only, feeder A is demonstrated as utilized with a swimming pool for sanitizing the contents thereof by chlorine obtainable from a readily soluble chlorine-containing compound. Side wall 2 of container 1 at the point immediately aligned with the upper face of plate 10 may have embossed, molded, engraved or otherwise inscribed therein a vertically progressing scale or series of gradation marks as at m which indicate liquid level markings and having accompanying numerals indicative of the rate of treatment compound being delivered. Said scale m coordinates with adjustable weir 7, with the upper limit of said scale m being aligned with the upper end edge of weir 7 when the same is in full "up" positon (See FIG. 2) and conversely the lower end of scale m is aligned with the upper end of weir 7 when the latter is in full "down" position. The utilization of scale m will be more apparent from the description below.

Container 1 is received in its lower end portion within the normally open upper end of a housing 34 having an annular side wall 35 and a base wall 36. The upper portion of side wall 35 constitutes an integral collar 37 having an inside diameter greater than that of side wall 35 but yet substantially equal to the outside diameter of the lower end of container 1 for telescopingly accepting the aforesaid lower end thereof which latter rests upon a shallow shoulder 38 formed between collar 37 and the underlying portion of side wall 35. Collar 37 is of such height that the upper end edge thereof, as at 37', is effectively aligned with the upper surface of plate 10. Projecting radially outwardly from side wall 2 of container 1 for travel relatively along edge 37' during any relative movement of container 1 with respect to housing 34 is a locking finger 39 for latching acceptance within a keeper 40 developed by a member 41 extending upwardly from said edge 37' (FIG. 6). Such engagement assures that appropriate relative positioning of container 1 with respect to housing 34 whereby apertures 42, 43 provided in collar 37 and container side wall 32, respectively, are brought into registration for projection therethrough of the discharge conduit 44 of a flow meter 45. It will be seen that the axis of discharge conduit 44 is substantially normal to the vertical axis of the aligned ports 18, 27. Conduit 44 is externally threaded for engaging the internal threads, as at 46, provided in opening 43.

Flow meter 45 is of conventional construction comprising a main tubular column 47 internally mounting a rotary flow control valve 48 at its upper end which is manipulable by a finger grippable tab 49 located externally upon the upper end of valve 48 so that through suitable turning the quantity of flow through discharge 44 which is axially perpendicular to column 47 may be controlled. Valve 48 contains a cylindrical side wall 50 having an orifice 51 of like cross-section or diameter as conduit 44 so that the effective opening of the latter may be adjusted by the relative position of orifice 51 with respect thereto. Valve 48 is open at its lower end for direct communication with column 47 but does embody an open seat 52 for a ball valve 53. At its lower end column 47 contains the usual valve seat 54 for ball valve 53 and below which seat 54 there is a passage 56 opening into an axially normal conduit 57; which latter by virtue of a coupling or nipple 58 is connected to an inlet tube 59 desirably of plastic or other flexible material.

It is to be understood that by operation of flow meter 45 the rate of flow of incoming liquid to feeder A may be closely controlled through manipulation of valve 48 and with the position of ball 53 within column 47 being visually indicated of the selected flow rate. Thus, for example, with valve 48 turned so that it is in full registration with discharge conduit 44 maximum flow will be obtained, with ball valve 53 being held under pressure of the incoming liquid against the spaced finger-forming seat 52. However, with valve 48 turned for a flow less than the maximum amount, ball valve 53 will be maintained by the differential liquid pressures acting thereon at some commensurate point within column 47, between seats 52,54 and with such location being easily visually determined by view of the transparency of column 47 so that by visual inspection the operator can ascertain any undesired variance in the flow rate. Thus with ball 53 midway between seats 52,54 a constant liquid volume is assured despite various system pressures. Flow meter 45 at its lower end, confronting housing 34, is provided with a projecting tongue 60 receivable within a groove-forming element 61 integral with the outer side wall of housing 34 to retain said flow meter 45 upright against pivotal movement about the upper end thereof. Therefore, flow meter 45 permits control of the liquid introduced into feeder A so that with such flow rate being constant, as with ball 53 midway, and being a known factor, the quantity of material to be dissolved therein can be determined to present the concentration preferred for the needs of the particular system in question.

Housing 34 below collar 37 constitutes a float chamber 62, the upper wall of which is defined by bottom wall 3 of container 1. Disposed within chamber 62 is a float valve 63, the lower end portion thereof being an upwardly opening receptacle 64, having a base wall 65 and an annular side wall 66. Projecting slightly radially outwardly from the upper end of side wall 66 in circumferentially spaced apart relationship is a plurality of flanges 67, each of which mounts an upstanding arm 68 having an inturned, hold-down finger 69 at the upper end thereof; said arms 68 having a limited resiliency due to the particular material of construction, and serving to engage a discrete float weight 70, as formed, for instance, of closed cell plastic foam or like material, which is supported upon flanges 67 with the sides and top restrained by arms 68 and fingers 69 against inadvertent shifting. With particular reference to FIG. 2 it will be seen that by reason of the limited height of flanges 67, openings 71 are developed between the intervening upper edge portions of receptacle side wall 66 and the base of float weight 70, permitting of ingress and egress of liquid into, and from, receptacle 64. Float weight 70 contains a central enlarged through-opening 72 for uninhibited relatively vertical movement therein of weir 7.

Formed integrally with base wall 65 and extending downwardly from the center of the underface thereof is a needle valve 73 tapered downwardly for flow-occluding extension into the bore 74 of a fitting 75 integral with and extending from bottom wall 36 of housing 34 with there being a shallow chamber 76 supporting a gasket 77 for liquid proof engagement with said needle valve 73 when in fully closed condition. Fitting 75 is externally threaded for securement to a coupler 78 for interconnection with a discharge pipe 79, preferably of flexible hosing. As is evident from FIG. 7, chemical feeder A is adapted for ready attachment to conventional components of the particular system within which it is incorporated as by adjustable clamping straps 80, 81 respectively engaged to adaptors 82, 83 disposed upon inlet tube 59 and discharge pipe 79 respectively, as to a suction hose 84 and a return hose 85 respectively (FIG. 7) within a liquid circulating system such as a swimming pool indicated generally at S. A like clamping strap 86 may be affixed to an extension 87 integral with the upper portion of container 1 and extending radially from one side thereof for engaging a post, pipe, or other fixture not shown. The means for easily integrating chemical feeder A within a particular system may be varied without departing from the spirit of the present invention, as the components described are merely examples of unique and simple means of effecting such incorporation.

With particular reference to FIG. 7, one example of such a system embodying the present invention is shown. Therein it will be noted that feeder A is suitably mounted as by strap 86 (not shown) upon a cross member and in a relatively elevated position immediately adjacent the pool wall. Discharge pipe 79 is connected through strap 80 and adapter 83 to suction hose 84 which leads from a skimmer 88 through which water is withdrawn from the pool for circulation by means of a conventional pump 89 to which suction hose 84 is engaged. Pump 89 is then connected to the usual filter 90 which in its upper portion discharges through return hose 85 for restoring the now filtered and treated fluid to the pool. It will be seen that inlet tube 59 through related clamp 81 and adaptor 82 is secured to return pipe 85 immediately adjacent filter 90.

Accordingly, the treated material is drawn, as by suction, from float chamber into suction hose and for ultimate restoration to the pool. However, inlet pipe 59 will cause a continual withdrawing of the liquid for treating purposes.

The operation of feeder A is as follows: In the normal or usual mode of operation weir 25 is in full "down" position with ports 27 and 18 in full registration, whereby the interior of weir 25 is in direct communication with lower chamber 33. Liquid, as for example water, to be treated will flow through flow meter 45 and thence through conduit 44 for reception within said lower chamber 33 and with the incoming liquid impinging against flange 22 which serves to disrupt and disperse the flow, thereby causing limited turbulence and hence distribution of the liquid throughout chamber 33 so that as the latter fills water will, as it were, "back upwardly" through plate orifices 20 and into upper compartment 32 for direct contact with the immediate, adjacent portions of the treatment material c. Water will, of course, flow through ports 27 and 18 and ultimately reach the height of the upper end of weir 7, which shall have been preliminarily vertically adjusted with respect to scale m so that its upper end is aligned with the gradation of said scale m indicating the desired concentration. Water will then flow over the upper edge of weir 7 and thence downwardly through the same and into float receptacle 64. As the latter becomes filled with the treated water, such will then overflow through openings 71 and into chamber 62. As the treated water within chamber 62 rises, it will tend to lift float valve 63 thereby causing a raising of needle valve 73 with opening of the latter so that flow may then proceed to discharge pipe 79. As pointed out above, scale m is calibrated to indicate the height to which the incoming water must reach for dissolving that quantity of the treatment material for a preselected concentration, as obviously the higher the water rises above plate 10 the greater the amount of chemical is exposed to the solvent. Weir 7 is of such length that with relationship to the supply of chemical it will assure of the predetermined concentration. It must be remembered that the treatment material is highly soluble so that from a practical standpoint there is no likelihood of clear, untreated water flowing directly from discharge conduit 44 through weir 7. Although with weir 7 in full lowered or "down" position, scarcely any treatment material will be brought into solution for discharge of liquid within chamber 32 as the same will not be permitted to rise to a level adequate to effect significant solubilizing of the chemical c. Manifestly, as the chemical c in compartment 32 is dissolved and discharged, the masses of such chemical thereabove will descend through gravity so that there will always be an appropriate supply of chemical depending upon the capacity of container 1.

The effective length of weir 7 is coordinated with the volume of container 1 and hence availability of treatment material at each level of said container so that said weir 7 is adjustable through a vertical range to accommodate concentrations which are most commonly utilized as in swimming pools, with such concentrations falling within a category which might be referred to as for normal chlorination and which accordingly is provided by the first or usual mode of operation of chemical feeder A. With the rate of flow of the incoming water being preselectedly controlled by flow meter 45, such as, for example, to provide 1½ liters per minute, and with weir 7 at the particular height for the desired concentration, a fully reliable and automatic control as to concentration of discharged liquid is assured.

When it is desired to effect a substantially high or abnormal concentration, which might be considered a super concentration, in the discharged liquid, that is greater than could be obtained through use of weir 7, weir 25 is rotated, through a partial turn, to cause port 18 to be occluded thereby placing said ports 18 and 27 in nonregistering relationship. In this condition the incoming water from conduit 44 will rise through orifices 20 and will continue to rise until the level is such that the same will initially flow through overflow opening 31 and such level will continue to rise until flow is effective through passage 29 in view of the relative smallness of opening 31 and the liquid will thence descent through weir 25, then through weir 7 for reception within float receptacle 64, with ultimate opening of needle valve 73 as the float valve 63 is elevated, as above described. It will be seen that the incoming liquid will flow through substantially the entire mass of the treatment material and thus dissolve the maximum amount so that the liquid descending through weir 25 will approximate a condition of saturation or possibly super saturation with maximum concentration being achieved. It is evident that the related position of weir 7 is completely immaterial to the operation for abnormal concentration as such solution is developed prior to any discharging flow through weir 7.

From the foregoing it will be seen that the present feeder is uniquely adapted for concentrations within customary ranges, as at a so-called normal treatment rate with weir 7 being suitably adjusted for the desired height and with ports 18 and 27 being aligned; and for higher concentrations, if desired, by a mere closing of port 18 through a turning of weir 25.

Although the foregoing indicates the two basic operating modes of the present invention, that is, in the first mode wherein adjustable weir 7 is used for liquid level control, and in the second mode wherein weir 25 functions for determination of the effective liquid level, there still remains a third condition which although of extreme importance is not necessarily an operating mode. This third state is one which permits the user, even from a respectable distance, to determine whether feeder A is malfunctioning. Thus, as developed hereinbelow the lower end portion of container 1 is received within the collar 37 of housing 34 so as to provide a limited spacing therebetween as will be evident from a study of FIGS. 2 and 3. Such annular spacing provides a passage communicating with the interior of housing 34. During normal or effective operation of feeder A in either of its first two modes of operation, there will be no escape of solution through such intervening spacing. However, if for any reason needle valve 73 is maintained in a closed condition during operation of feeder A, thereby denying flow of the liquid solution through discharge pipe 79, the solution within said housing 34 will manifestly "back upwardly" through the spacing between container 1 and collar 37 and overflow the upper edges thereof in a direction broadly indicated by the arrows in FIGS. 2 and 3. The overflow will thus cause the solution to drain downwardly about the exterior of housing 34 and such condition will immediately indicate to the operator that there has been an obstruction to flow so that feeder A is thus failing to function in either of its productive modes. One of the most usual conditions which bring about this malfunction is the development of suction within discharge pipe 79, that is, a reduction of pressure so that the float valve will be forced downwardly by reason of the differential between such diminished pressure and atmospheric pressure. Clearly this condition can be quickly rectified by turning off the system and taking such steps as to overcome the inadvertent development. Thus, this aforesaid spacing or limited point between container 1 and housing 34 brings about a very unique result and minimizes the length of time during which the feeder would improperly operate.

Furthermore, as also believed pointed out above, container 1, housing 34 and weir 25, as well as flow meter 45 are made of transparent material so that the operator also has ready visual access to the interior of the system for assurance of proper functioning.

Chemical feeder A additionally represents a marked advance in the art by reason of the unique construction of float valve 63. It will be observed with particular reference to FIGS. 2 and 3 that said valve is readily distinguishable from the common float valves which are customarily mounted upon an arm which is fulcrumed or pivotally mounted upon a convenient support within the particular float chamber. Thus, by obviating such normally rockable support arm, float valve 63 is thus truly of free floating character so as to rise and fall responsive to the level of liquid within float chamber 62 independent of the mechanics of the conventional support arm.

It is to be further noted that said float valve 63 thus provides a double function in that it serves during normal operation as a throttle, moving up and down responsive to the flow of liquid entering the exiting through discharge pipe 79, while also serving as a shutt off valve. Thus, as demonstrated above, should the liquid within chamber 62 be inadequate to buoy valve 63, the same will descend into closed condition as shown in FIG. 2 and effectively inhibit further liquid discharge pending receipt within said chamber of adequate liquid for displacement by valve 63 so as to open discharge pipe 79.

Having described my invention, what I claim and desire to obtain by Letters Patent is:

1. Apparatus for feeding liquid soluble treatment matter into a liquid circulating system comprising means defining a container, a partition dividing said container internally into an upper compartment and a lower compartment, said upper compartment receiving a supply of said liquid treatment matter supported upon said partition, means for introducing liquid solvent within said lower compartment, orifice-defining means in said partition through which liquid introduced into said lower compartment rises into said upper compartment for dissolving said treatment matter and through which means the developed liquid solution flows into said lower compartment, a vertically presented liquid-solution discharge conduit open at the upper and lower ends thereof provided in said lower compartment, said lower compartment having a bottom opening, said conduit engageable in the lower end portion thereof within said last mentioned opening, and means effecting communication between the lower compartment and the upper end of said conduit.

2. Apparatus as defined in claim 1 and further characterized by flow distributing means provided in said lower compartment for impingement thereon of liquid solvent introduced into said lower compartment.

3. Apparatus as defined in claim 1 and further characterized by said means for introducing liquid solvent within said lower compartment comprising a flow meter, and means for adjusting the rate of flow within said flow meter for facile visual determination.

4. Apparatus as defined in claim 3 and further characterized by said partition comprising a plate, means provided in said lower compartment for removably supporting said plate, flow directing means integral with said plate and projecting downwardly therefrom into said lower compartment and into the path of liquid solvent introduced into said lower compartment, and said means introducing said liquid solvent comprising a flow control device.

5. Apparatus as defined in claim 1 and further characterized by housing-forming means having a side wall, a bottom wall, and being open at its top, the upper portion of said housing-forming means receiving the lower compartment-forming portion of said container with the bottom wall of said lower compartment being spaced from the bottom wall of said housing to define therewith a float chamber, the open lower end of said conduit establishing communication between said container and said housing-forming means, and a float valve provided in said float chamber.

6. Apparatus as defined in claim 5 and further characterized by said housing-forming means having an internal shoulder spaced from its upper end edge a distance substantially coincident with the height of the lower compartment of said container whereby the upper surface of said partition is substantially coincident planarwise with the upper edge of said housing, said upper portion of said housing being of slightly greater internal diameter than the outside diameter of the received portion of said container for developing a relatively open joint therebetween permitting of fluid escape therethrough in the event of malfunction whereby said fluid escape serves as a visual indicator of the presence of such malfunction.

7. Apparatus as defined in claim 5 and further characterized by a liquid solution outlet provided within the bottom wall of said float chamber, said float valve having a needle valve depending from its lower end and receivable within said liquid solution outlet when said float valve is in closed condition.

8. Apparatus as defined in claim 7 and further characterized by said float valve comprising a lower liquid receptacle and a float weight supportable thereon for integration therewith, said float weight having a central opening aligned with the container lower compartment bottom opening and being of such cross-section as to permit extension therethrough of the lower end portion of said conduit permitting discharge of the liquid solution whereby the same is acceptable within the receptacle of said float valve, and discharge openings provided between said float chamber receptacle and said float weight for flow of the liquid solution therethrough for elevation of said float chamber with consequent opening of said needle valve permitting of discharging of the liquid solution through said liquid outlet.

9. Apparatus as defined in claim 1 and further characterized by said lower compartment having a bottom wall in substantial planar parallel relationship to said partition, there being an aperture in said partition aligned with said lower compartment bottom opening, and means rendering said conduit vertically adjustable for selected positioning of the same with respect to said lower compartment bottom opening.

10. Apparatus as defined in claim 9 and further characterized by said conduit being of a greater length than the maximum vertical extent of said lower compartment.

11. Apparatus as defined in claim 9 and further characterized by said orifice-defining means being a plurality of circumferentially spaced-apart orifices located radially outwardly of said partition aperture.

12. Apparatus for feeding liquid soluble treatment matter into a liquid circulating system comprising means defining a container, a partition dividing said container internally into an upper compartment and a lower compartment, said upper compartment receiving a supply of said liquid treatment matter supported upon said partition, means for introducing liquid solvent within said lower compartment, orifice-defining means in said partition through which liquid introduced into said lower compartment rises into said upper compartment for dissolving said treatment matter and through which orifice-defining means the developed liquid solution flows into said lower compartment, adjustable means permitting discharge of the developed liquid solution from the lower compartment after the liquid solution has risen to a predetermined level within said upper compartment, and a tubular weir provided within said container in surrounding relationship to said adjustable means allowing discharge of the liquid solution from the upper compartment and having its upper end terminating in immediate proximity to the upper end of said container.

13. Apparatus as defined in claim 12 and further characterized by gradation markings provided on said container above a point aligned with said partition for correlation with the degree of elevation of the upper end of said conduit above said partition means.

14. Apparatus for feeding liquid soluble treatment matter into a liquid circulating system comprising means defining a container, a partition dividing said container internally into an upper compartment and a lower compartment, said upper compartment receiving a supply of said liquid treatment matter supported upon said partition, means for introducing liquid solvent within said lower compartment, orifice-defining means in said partition through which liquid introduced into said lower compartment rises into said upper compartment for dissolving said treatment matter and through which orifice-defining means the developed liquid solution flows into said lower compartment, said lower compartment having a bottom opening, said partition having an opening aligned with said lower compartment bottom opening, a vertically disposed open-ended conduit engaged in said lower compartment bottom opening and adapted for selected vertical positioning with respect to said last mentioned opening, an elongated weir provided within said container in encircling relationship to said conduit, the upper end of said weir being located spacedly above the upper end of said conduit in proximity to the upper end of said container, said weir having an aperture adjacent the upper end thereof for flow therethrough of liquid solution when the level of such within said upper container reaches such height, and means provided within said lower compartment above, and concentric with said lower compartment bottom opening engaging the lower end of said weir.

15. Apparatus as defined in claim 14 and further characterized by means for optionally permitting direct flow between said lower compartment and the lower portion of said weir.

16. Apparatus for feeding liquid soluble treatment matter into a liquid circulating system comprising means defining a container, a partition dividing said container internally into an upper compartment and a lower compartment, said upper compartment receiving a supply of said liquid treatment matter supported upon said partition, means for introducing liquid solvent within said lower compartment, orifice-defining means in said partition through which liquid introduced into said lower compartment rises into said upper compartment for dissolving said treatment matter and through which orifice-defining means the developed liquid solution flows into said lower compartment, said lower compartment having a bottom opening, an open-ended conduit engaged within said last mentioned opening for vertical adjustability relative to said lower compartment permitting discharge of the developed liquid solution from the lower compartment after the liquid solution has risen to a predetermined level within said upper compartment, a tubular weir provided within said container for projection upwardly therein, means engaging the lower portion of said weir within said lower compartment, said weir being in surrounding relationship to said conduit, thereby shielding same from direct contact with ambient solution being formed in said upper compartment, the upper end portion of said weir terminating in relative proximity to the upper end of said container whereby liquid solution from the upper end portion of said upper compartment may discharge into said weir for alternate flow into said conduit.

17. Apparatus as defined in claim 16 and further characterized by said means engaging the lower portion of said weir comprising an upwardly opening annular support mounted on the bottom of said lower compartment and being internally threaded, said weir being externally threaded in its lower end portion for engaging said support, there being alignable ports provided in said support and said weir lower end portion through which developed liquid solution may flow from the lower compartment into the interior of said weir for discharge through the open upper end of said conduit.

18. Apparatus as defined in claim 17 and further characterized by said alignable ports in said support and said weir being closable upon preselected threading of said weir, thereby preventing flow from said lower compartment directly into said conduit and thus permitting liquid solution discharge only from the upper compartment through the upper end of said weir.

19. Apparatus as defined in claim 17 and further characterized by an annular flow directing member depending from said partition in radially outwardly spaced, concentric relationship with said support, being disposed within the path of liquid solvent induced into said lower compartment.

20. Apparatus as defined in claim 12 and further characterized by means preventing flow of the developed liquid solution from the lower compartment into said adjustable means whereby liquid solution discharge may be effected only through said tubular weir.

21. Apparatus for feeding liquid soluble treatment matter into a liquid circulating system comprising means defining a container, a partition dividing said container internally into an upper compartment and a lower compartment, said upper compartment receiving a supply of said liquid treatment matter supported between said partition, means for introducing liquid solvent within said lower compartment, orifice-defining means in said partition through which liquid introduced into said lower compartment rises into said upper compartment for dissolving said treatment matter and through which orifice-defining means the developed liquid solution flows into said lower compartment, adjustable means permitting discharge of the developed liquid solution from the lower compartment after the liquid solution has risen to a predetermined level within said upper compartment, an elongated weir provided within said container in surrounding relationship to said adjustable means and projecting thereabove, the upper end of said weir being presented in relative proximity to the upper end of said container, said weir having an aperture adjacent its upper end for flow therethrough of liquid solution developed in the upper compartment when the level of such solution therein reaches such height, and optionally operated means provided within said lower compartment for preventing flow of liquid solution within the lower compartment for discharge by said adjustable means to assure of flow through said weir, said weir in its lower end portion communicating with said adjustable means.

22. Apparatus as defined in claim 9 and further characterized by said conduit being of such length as to be extensible through said partition aperture into said upper compartment, a tubular weir provided in said container in surrounding relationship to said conduit, said weir having a lower end portion engageable within said lower compartment and having an open lower end alignable with said lower compartment bottom opening, said weir having an upper portion extending through said partition aperture into said upper compartment with its upper end terminating substantially upwardly of the upper end of said conduit and means for selectedly permitting flow through the lower end portion of said weir within said lower compartment for delivery of the liquid solution to the upper end of said conduit.

23. Apparatus as defined in claim 12 and further characterized by said adjustable means being of such length as to be selectedly extensible into said upper compartment.

* * * * *